US010052770B2

(12) United States Patent
Porter et al.

(10) Patent No.: US 10,052,770 B2
(45) Date of Patent: Aug. 21, 2018

(54) FASTENING SYSTEM WITH VACUUM ALIGNMENT TOOL AND METHODS OF OPERATING SAME

(71) Applicant: THE BOEING COMPANY, Huntington Beach, CA (US)

(72) Inventors: John Richard Porter, Edgewood, WA (US); Daniel Thomas Long, Federal Way, WA (US); Raymond C. Eng, Seattle, WA (US); Bruce J. Hanninen, Renton, WA (US); Kevin Michael Bell, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 478 days.

(21) Appl. No.: 14/819,669

(22) Filed: Aug. 6, 2015

(65) Prior Publication Data
US 2017/0036350 A1  Feb. 9, 2017

(51) Int. Cl.
*B25J 11/00* (2006.01)
*B25J 15/06* (2006.01)
*B23P 19/10* (2006.01)

(52) U.S. Cl.
CPC ............ *B25J 11/005* (2013.01); *B23P 19/10* (2013.01); *B25J 11/00* (2013.01); *B25J 15/0616* (2013.01)

(58) Field of Classification Search
CPC ............................. B25B 11/00; B25B 11/005
USPC .......................................................... 269/21
See application file for complete search history.

(56) References Cited

U.S. PATENT DOCUMENTS 9,316,247 B2 * 4/2016 Butvin .................. B21J 15/022
2013/0255053 A1   10/2013 Erickson

\* cited by examiner

*Primary Examiner* — Jason L Vaughan
*Assistant Examiner* — Amanda Meneghini
(74) *Attorney, Agent, or Firm* — Armstrong Teasdale LLP (57) ABSTRACT

In one aspect, a vacuum alignment tool for holding and aligning a first fastener with a second fastener is provided. The vacuum alignment tool includes a main body including an end wall having an aperture disposed therein configured to receive at least a portion of the first fastener. The vacuum alignment tool also includes a vacuum receiving portion coupled to the main body. The vacuum receiving portion including a vacuum bore disposed therein, wherein a vacuum channel extends within the main body and within the vacuum receiving portion between the aperture and the vacuum bore.

20 Claims, 8 Drawing Sheets

FASTENING SYSTEM WITH VACUUM ALIGNMENT TOOL AND METHODS OF OPERATING SAME

BACKGROUND

The present disclosure relates generally to fastening systems and, more particularly, to fastening systems and methods using suction force to position a collar on a bolt.

At least some known fastening systems include a multi-step process for affixing a collar to a bolt. More specifically, at least some known fastening systems include a collar feeding system that, in the first step, aligns the collar with the bolt and positions the collar onto the bolt within a narrow tolerance. Because of the narrow alignment tolerances, at least some collar feeding systems include a technician manually aligning and positioning each collar onto the bolt. The second step of at least some known fastening systems includes aligning a fastening tool, such as a swaging tool, with the pre-positioned collar and swaging the collar to the bolt. Similar narrow tolerances exist when aligning the swaging tool with the collar as when aligning the collar with the bolt.

Accordingly, at least some known fastening systems are time consuming processes that may require manually positioning components of the system to meet certain narrow tolerances. Also, if either the collar or the swaging tool is out of alignment, the collar will not fasten correctly to the bolt, requiring additional time and labor to remove the incorrectly fastened components and perform the process again.

BRIEF DESCRIPTION

In one aspect, a vacuum alignment tool for holding and aligning a first fastener with a second fastener is provided. The vacuum alignment tool includes a main body including an end wall having an aperture disposed therein configured to receive at least a portion of the first fastener. The vacuum alignment tool also includes a vacuum receiving portion coupled to the main body. The vacuum receiving portion including a vacuum bore disposed therein, wherein a vacuum channel extends within the main body and within the vacuum receiving portion between the aperture and the vacuum bore.

In another aspect, a fastening system is provided. The fastening system includes a fastening tool configured to couple a first fastener to a second fastener and a vacuum alignment tool coupled to the fastening tool. The vacuum alignment tool includes a main body including an end wall having an aperture disposed therein configured to receive at least a portion of the first fastener. The vacuum alignment tool also includes a vacuum receiving portion coupled to the main body. The vacuum receiving portion includes a vacuum bore define therein, wherein a vacuum channel is disposed between the aperture and the vacuum bore. The fastening system further includes a vacuum source coupled to the vacuum receiving portion and configured to apply a suction force through the vacuum channel to hold at least the portion of the first fastener within the aperture.

In yet another aspect, a method of coupling a first fastener to a second fastener using a fastening system is provided. The fastening system includes a fastening tool, a vacuum alignment tool, and a vacuum source. The method includes positioning the first fastener within a body bore disposed in a main body of the vacuum alignment tool and activating the vacuum source to apply a suction force to the first fastener through a vacuum channel disposed in the vacuum alignment tool. The method also includes positioning the first fastener about the second fastener, wherein the first and second fasteners are concentric.

DETAILED DESCRIPTION

The implementations described herein include a fastening system for use in coupling a first fastener, such as a collar, to a second fastener, such as a bolt. The fastening system includes a robotic fastening tool that engages at least one of the collar and the bolt for coupling them together. The fastening system also includes a vacuum-operated alignment tool coupled to an end portion of the fastening tool and configured to house the collar within a bore disposed in the alignment tool. The vacuum alignment tool is also coupled to a vacuum source that applies a suction force through a vacuum channel formed in the alignment tool to hold the collar in position within the alignment tool bore. Because the vacuum alignment tool is coupled to the fastening tool (with the bore concentrically aligned with the fastening tool), when the fastening tool is moved into alignment with the bolt, the preloaded collar within the vacuum alignment tool is automatically aligned with the bolt. As such, the fastening system includes a single step process that delivers the collar directly onto the targeted bolt by holding the preloaded collar within the bore of the vacuum alignment tool and, thus, eliminating the step of independently aligning a collar with a bolt and subsequently aligning a fastening tool with the collar and the bolt.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Figure 1:
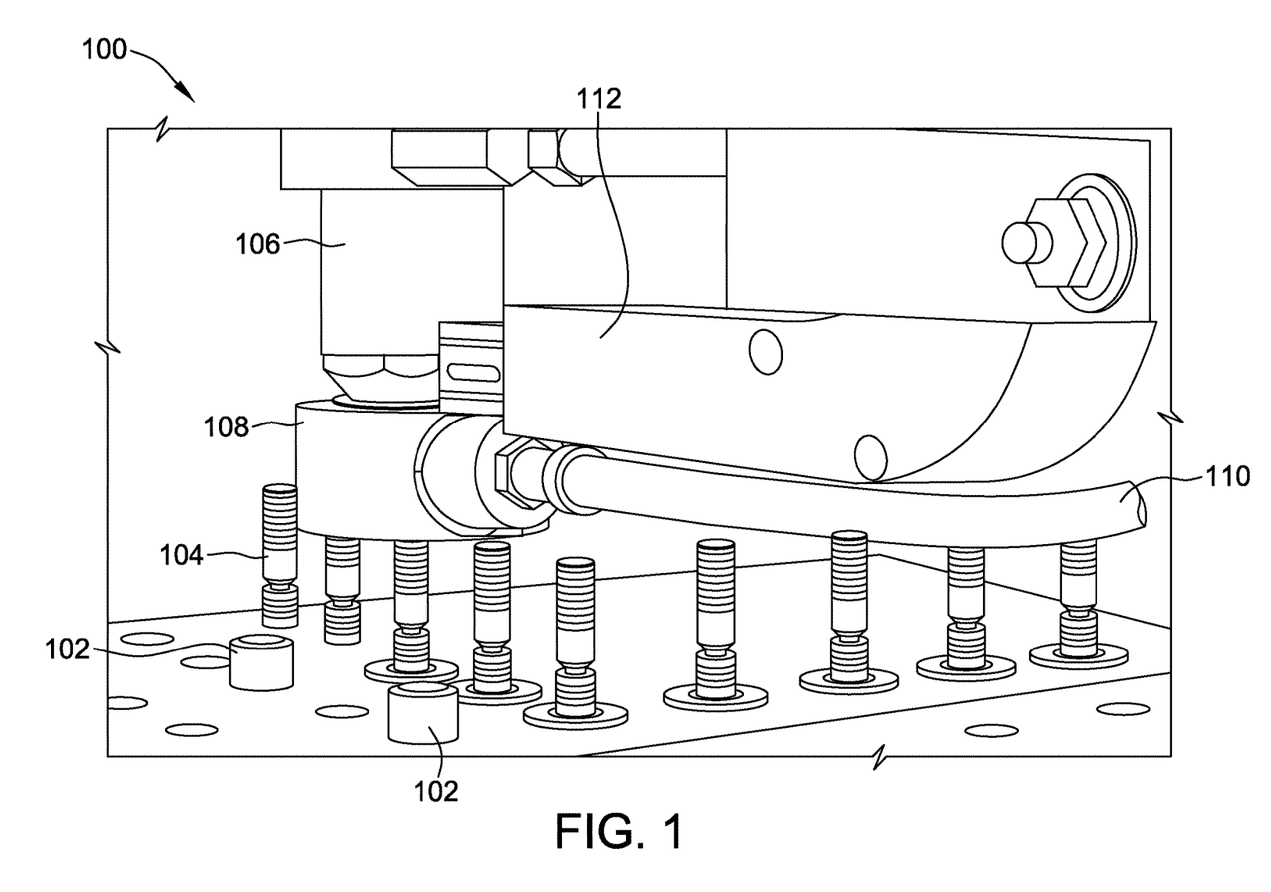
FIG. 1 is a perspective view of an exemplary fastening system in an initial position.

FIG. 1 is a perspective view of an exemplary fastening system 100 in an initial position. Fastening system 100 includes and is configured to couple a first fastener to a second fastener. In the exemplary implementation, the first fastener is a collar 102 and the second fastener is a bolt 104. Alternatively, fastening system 100 is configured to couple any type of fastener to a second target fastener.

In the exemplary implementation, fastening system 100 includes a fastening tool, such as, but not limited to, a swaging device 106. System 100 also includes a vacuum alignment tool (VAT) 108 coupled to swaging device 106 and a vacuum source 110 coupled to VAT 108. In one implementation, fastening system 100 also includes an automated collar dispensing system 112 coupled to at least one of device 106 and VAT 108. Collar dispensing system 112 retains a plurality of collars 102 and delivers one collar 102 at a time to VAT 108. Alternatively, fastening system 100 does not include a collar dispensing system 112.

Figure 2:
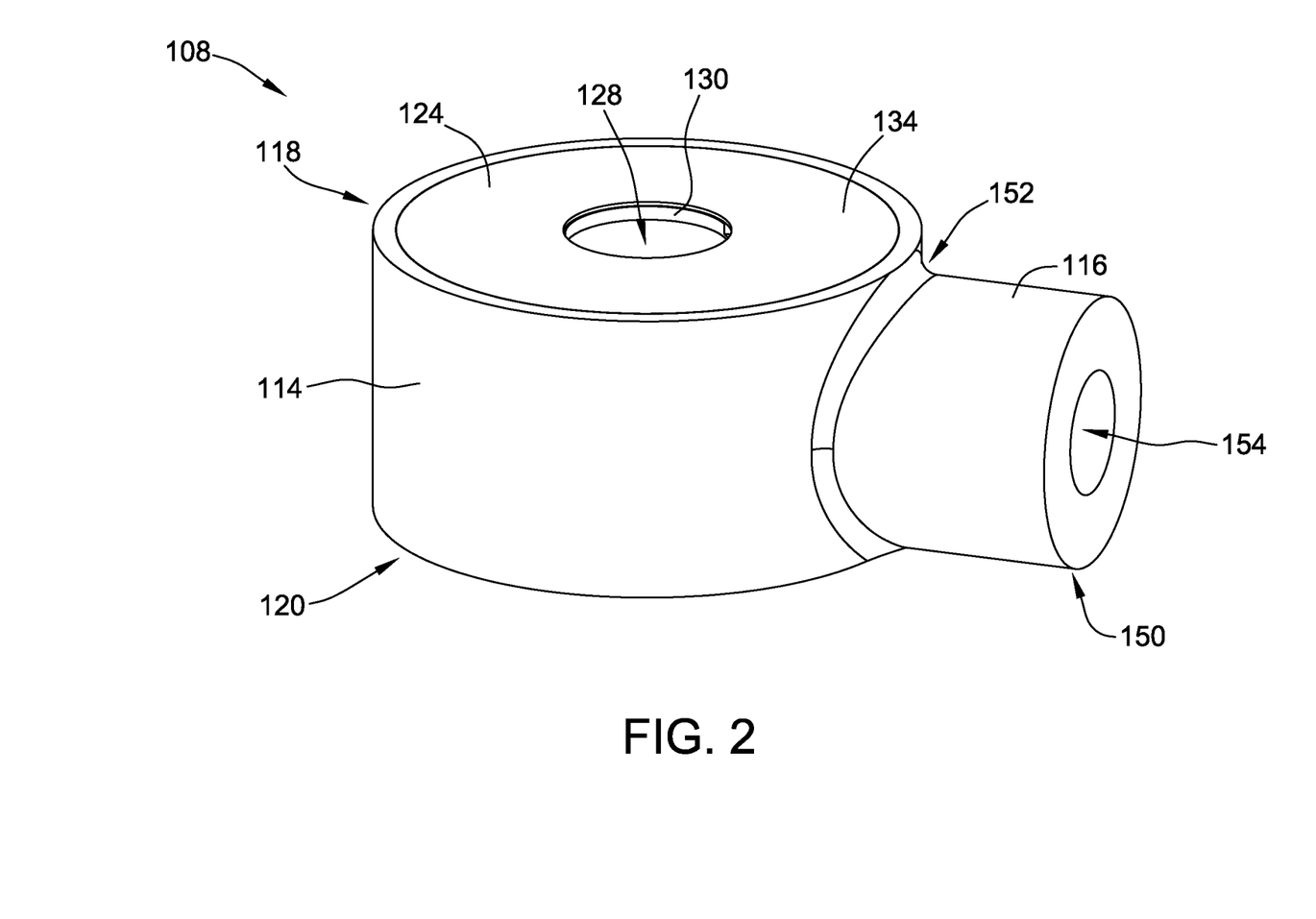
FIG. 2 is a perspective top view of an exemplary vacuum alignment tool that may be used with the fastening system shown in FIG. 1.
Figure 3:
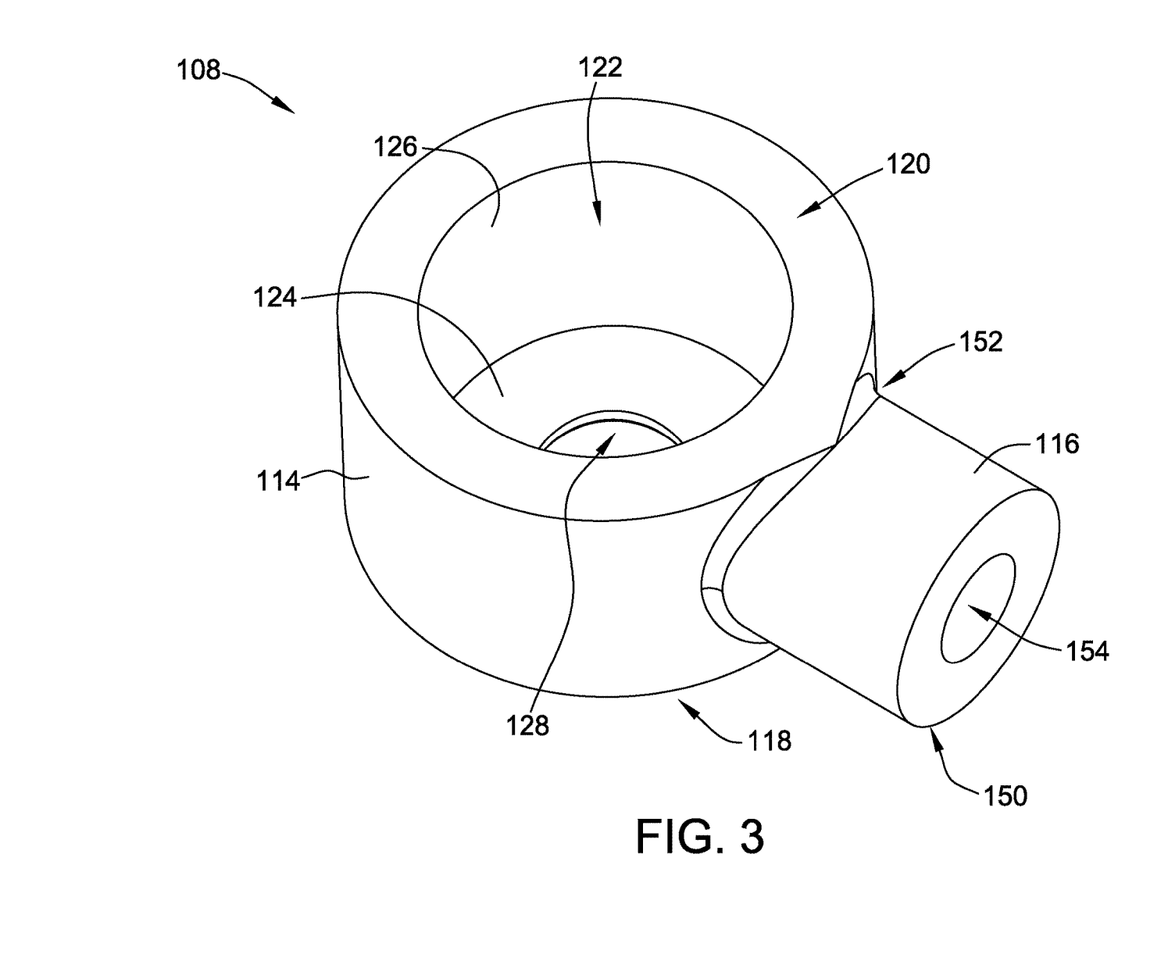
FIG. 3 is a perspective bottom view of the vacuum alignment tool.
Figure 4:
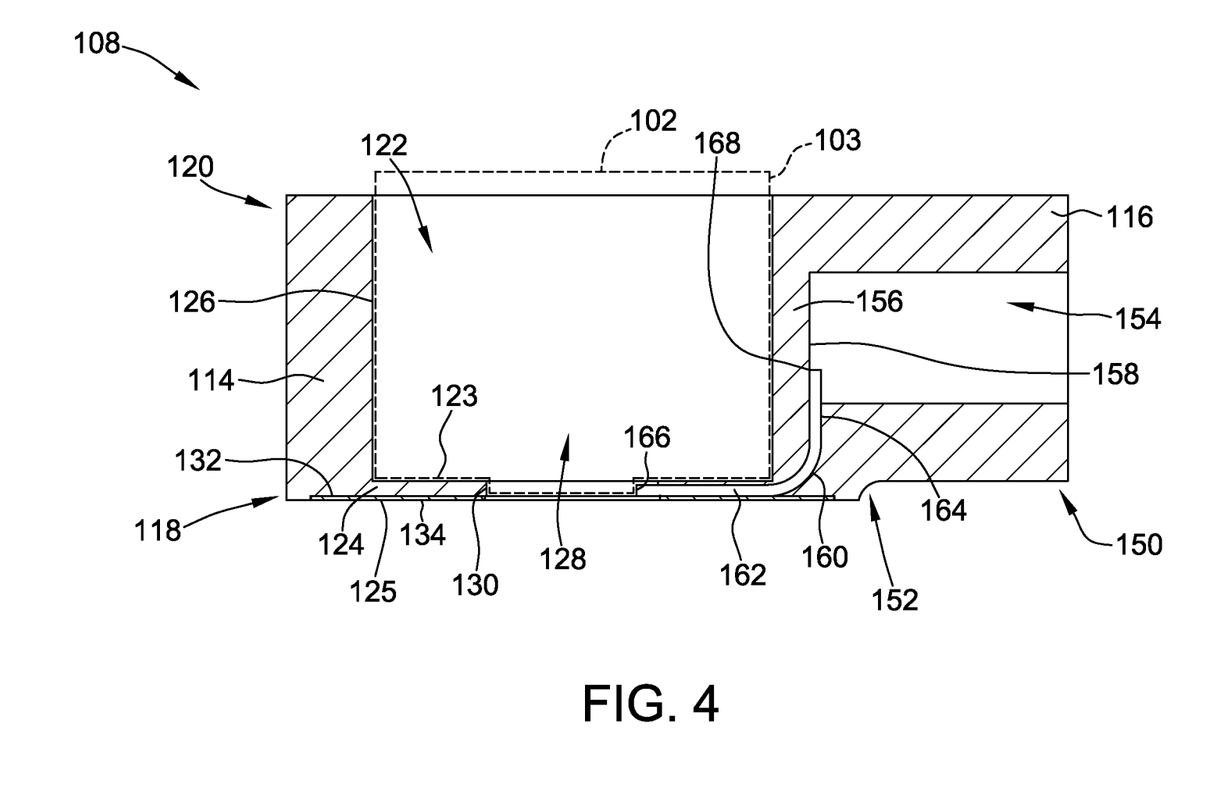
FIG. 4 is a side-cross-sectional view of the vacuum alignment tool.
Figure 5:
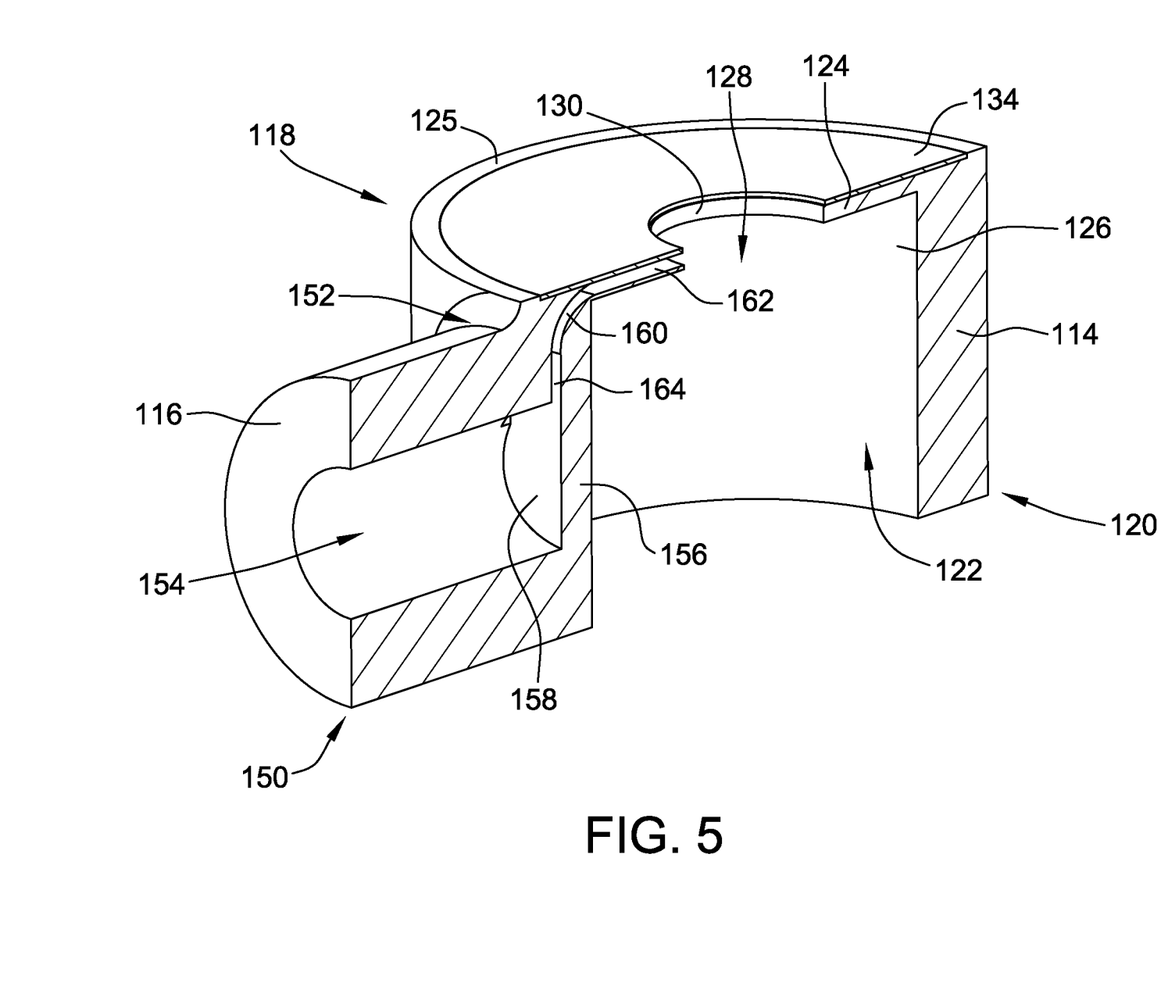
FIG. 5 is a perspective cross-sectional view of the vacuum alignment tool.

FIGS. 2-5 are different views of VAT 108 that may be used with fastening system 100 (shown in FIG. 1). Specifically, FIG. 2 is a perspective top view; FIG. 3 is a perspective bottom view; FIG. 4 is a side-cross-sectional view; and FIG. 5 is a perspective cross-sectional view. In the exemplary implementation, VAT 108 includes a main body 114 and a vacuum receiving portion 116 integrally formed with body 114. Alternatively, vacuum receiving portion 116 is a separate component coupled to body 114. Main body 114 is substantially cylindrical and includes a first end 118 and an opposite second end 120. In another embodiment, main body 114 includes any shape that facilitates operation of VAT 108 as described herein. In the exemplary implementation, second end 120 includes a main body bore 122 configured to receive collar 102 therein. Bore 122 extends from second end 120 toward an end wall 124 at first end 118 of main body portion 114. In the exemplary implementation, bore 122 is substantially circular to correspond to the circular shape of collar 102. Alternatively, bore 122 includes any shape that corresponds to a shape of collar 102. Bore 122 also includes an inner surface 126 that is in a face-to-face relationship with an outer surface 103 of collar 102. In the exemplary implementation, surfaces 126 and 103 are spaced apart by between approximately 0.0015 inches (in.) and approximately 0.0025 in. Alternatively, surfaces 126 and 103 may contact each other at predetermined points about bore 122. Generally, collar 102 fits within bore 122 with a minimal gap or spacing between the collar 102 and bore 122, which has a relatively small tolerance.

End wall 124 of main body first end 118 is configured to be removably coupled to fastening tool 106. In the exemplary implementation, end wall 124 includes an aperture 128 disposed therethrough that is substantially concentric with, and is a portion of main body bore 122. Aperture 128 includes an inner surface 130 that receives at least a portion of collar 102 to hold collar 102 within bore 122, as described in further detail below. In one implementation, end wall 124 also includes a notch or groove 132 disposed therein and configured to receive a cover 134 such that the end surface of first end 118 is substantially planar. In another implementation, end wall 124 does not include cover 134.

In the exemplary implementation, vacuum receiving portion 116 is substantially cylindrical and includes a distal first end 150 and an opposing second end 152 integrally formed with main body portion 114. Alternatively, vacuum receiving portion 116 is a separate component from main body portion 114 and second end 152 is coupled to main body portion 114. In the exemplary implementation, first end 150 includes a vacuum bore 154 configured to receive vacuum source 110 therein. Bore 154 extends from first end 150 toward an interior wall 156 of VAT 108. In the exemplary implementation, bore 154 is substantially circular to correspond to the circular shape of vacuum source 110. Alternatively, bore 1154 includes any shape that corresponds to a shape of vacuum source 110.

Interior wall 156 includes a portion of both main body 114 and vacuum receiving portion 116, such that interior wall 156 serves as a dividing wall between main body bore 122 and vacuum bore 154. More specifically, one surface of interior wall 156 is also inner surface 126 of body bore 122, and the opposing surface of interior wall 156 is an end surface 158 of vacuum bore 154. As described above, both main body portion 114 and vacuum receiving portion 116 are substantially cylindrical and each include a bore 122 and 154, respectively, disposed therein. In the exemplary implementation, main body portion 114 and vacuum receiving portion 116, and therefore bores 122 and 154, are oriented substantially perpendicular to each other.

In the exemplary implementation, VAT 108 also includes a vacuum channel 160 configured to couple vacuum bore 154 in flow communication with body bore 122, and, more specifically, with aperture 128. Channel 160 includes a first portion 162 disposed in main body portion 114 and a second portion 164 disposed in vacuum receiving portion 116 such that channel 160 extends through interior wall 156. Specifically, first portion 162 is disposed in end wall 124. First portion 162 includes a first end 166 in flow communication with aperture 128. Similarly, second portion 164 includes a second end 168 in flow communication with vacuum bore 154. In the exemplary implementation, channel 160 is substantially L-shaped such that first and second portions 162 and 164 are substantially perpendicular to each other. Additionally, each of channel portions 162 and 164 include a substantially similar thickness and width such that channel 160 includes a constant thickness and width between ends 166 and 168. Alternatively, channel portions 162 and 164 include different thicknesses and/or widths to vary the suction force applied by vacuum source 110 between ends 166 and 168.

First portion 162 of channel 160 is disposed in end wall 124 between an end surface 123 of body bore 122 and an outer surface 125 of end wall 124. In the exemplary implementation, end wall 124 includes a thickness only slightly larger than a thickness of first channel portion 162. Alternatively, end wall 124 and first channel portion 162 include any thicknesses that facilitate operation of VAT 108 as described herein. In embodiments having cover 134, first channel portion 162 is at least partially disposed by cover 134 between cover 134 and end surface 134. Channel portion 160 extends from vacuum bore 154 to inner surface 130 of the aperture 130 positioned above the body bore 122 in which the first fastener is received, to establish fluid communication with a vacuum source for applying a vacuum at the aperture 130 above the body bore 122 to retain the first fastener that is received within the body bore 122.

As described above, VAT 108 is an integral component including main body portion 114 and vacuum receiving portion 116. In the exemplary implementation, VAT 108 is manufactured from a synthetic polymer using one of an additive manufacturing or an injection molding process. Alternatively, VAT 108 is manufactured from any material using any production process that facilitates operation of Vat 108 as described herein. Generally, VAT 108 is manufactured from a partially flexible material that enables Vat 108 to release collar 102 after fastening, as described in further detail below.

Figure 6:
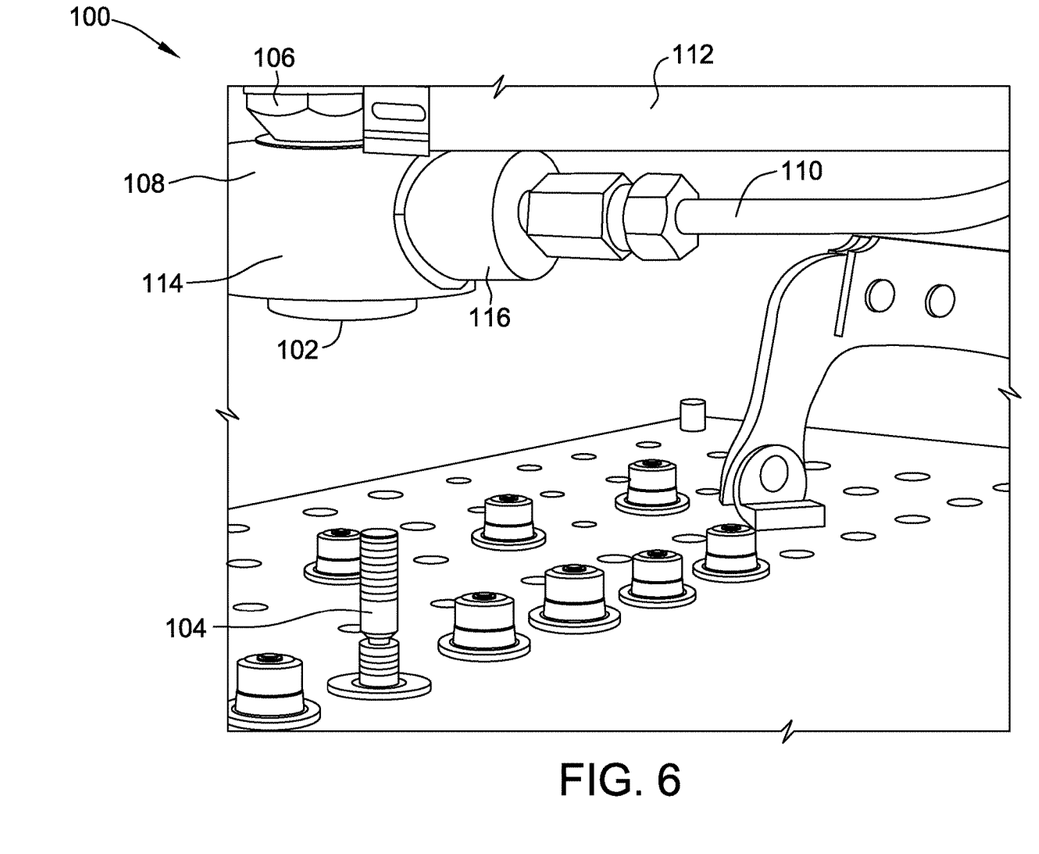
FIG. 6 is a perspective view of the fastening system in an intermediate position.
Figure 7:
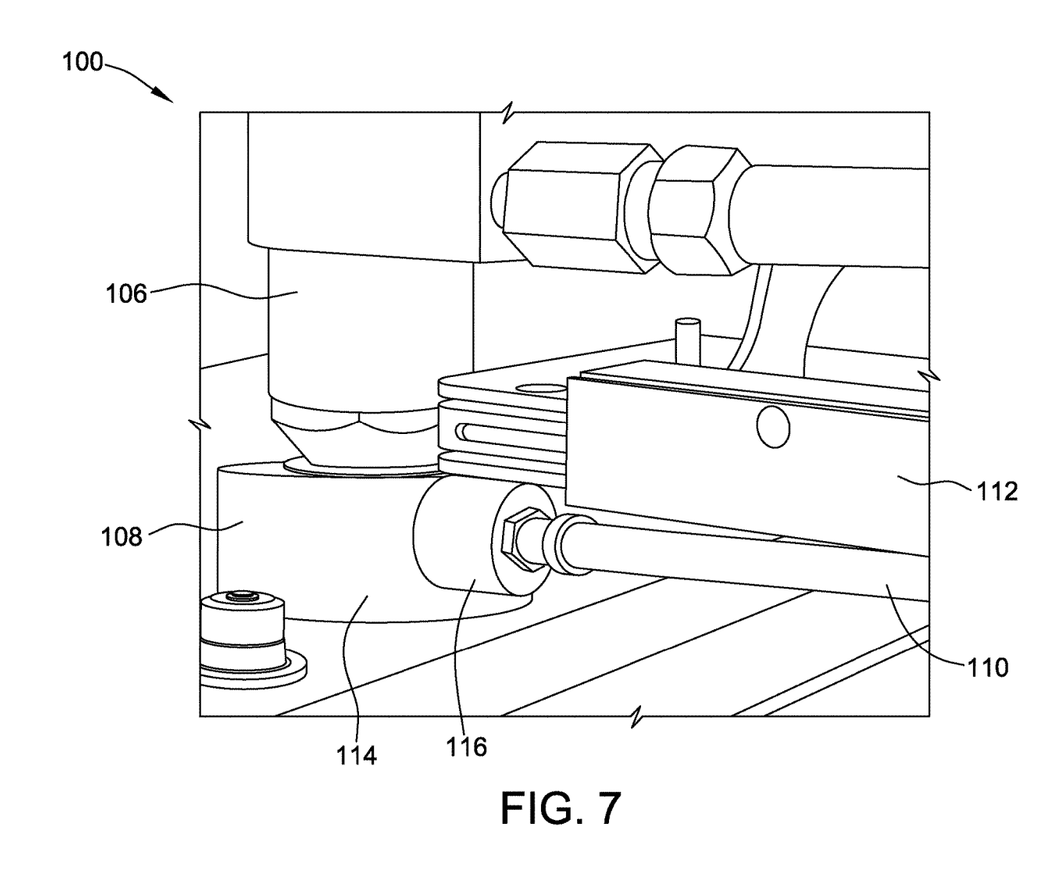
FIG. 7 is a perspective view of the fastening system in a subsequent position.
Figure 8:
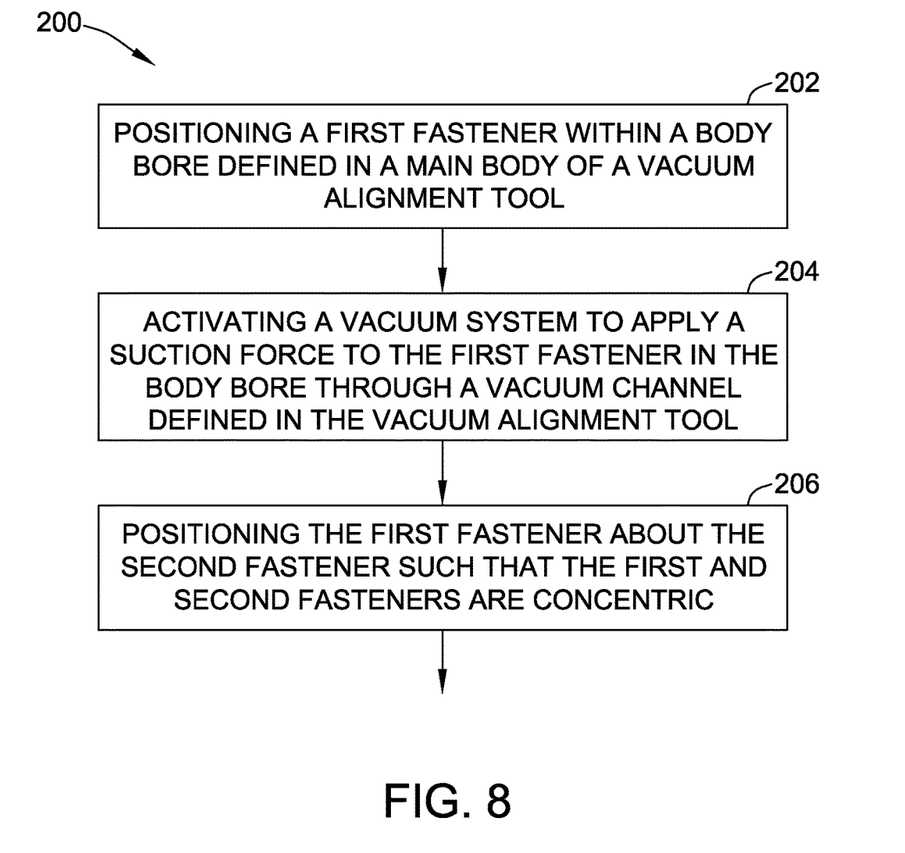
FIG. 8 is a flow diagram of an exemplary method of operating the fastening system.

Referring again to FIG. 1, fastening system 100 is shown in an initial position with VAT 108 coupled to fastening tool 106 and vacuum source 110 coupled to VAT 108. FIG. 6 illustrates fastening system 100 in an intermediate position where collar 102 is positioned within VAT 108 and is aligned with bolt 104. FIG. 7 illustrates fastening system in a subsequent position to that shown in FIG. 6 where collar 102 is positioned about bolt 104 and fastening tool 106 is engaging at least one of collar 102 and bolt 104. FIG. 8 is a flow diagram of an exemplary method 200 of operating fastening system 100.

Method 200 includes positioning 202 collar 102 within body bore 122. The positioning 202 step includes positioning collar 102 within bore 122 such that at least a portion of collar 102 is positioned within aperture 128 of end wall 124 proximate first end 168 of vacuum channel 160. In such a configuration, outer surface 103 of collar 102 is adjacent inner surface 126 of body bore 122 and inner surface 130 of aperture 128. The positioning 202 step may include delivering a collar 102 to body pore 122 from collar dispensing system 112 coupled to fastening tool 106. Alternatively, collar 102 is positioned within body bore 122 using any method that facilitates operation of fastening system 100 as described herein.

Method 200 also includes activating 204 vacuum source 110 to apply a suction force to collar 102 through vacuum channel 160. In the exemplary implementation, when vacuum source 110 is activated, a suction force is applied to collar 102 through vacuum channel 160 such that collar 102 remains within body bore 122 despite not being supported underneath. As such, the suction force applied to collar 102 is sufficient to overcome gravity when collar 102 is positioned within body bore 122. The suction force may cause outer surface 103 of collar 102 to contact at least one of inner surfaces 126 and 130 such that a vacuum is created within vacuum channel 160.

In the exemplary implementation, once collar 102 is positioned within VAT 108, method 200 also includes moving fastening tool 106 and VAT 108 to position 206 collar 102 about bolt 104. The positioning 206 step includes aligning fastening tool 106 with bolt 104. Because VAT 108 is already aligned with fastening tool 106 and collar 102 is positioned within VAT 108, aligning fastening tool 106 with bolt 104 automatically aligns collar 102 with bolt 104 to enable collar 102 to be positioned about bolt 104. As such, fastening system 100 includes a single step process that delivers collar 102 directly onto the targeted bolt 104 by holding collar 102 within body bore 122 of VAT 108 and, thus, eliminating the step of independently aligning a collar with a bolt and subsequently aligning a fastening tool with the collar and the bolt, as required by at least some known fastening systems.

Method 200 also includes deactivating vacuum source 110 once collar 102 is positioned about bolt 104. VAT 108 supports collar 102 on bolt 104 and, as such, vacuum source 110 may be deactivated. In another implementation, vacuum source 110 continues to apply the suction force to collar 102 when collar 102 is positioned about bolt 104. In the exemplary implementation, when collar 102 is positioned about bolt 104, fastening tool 106 engages at least one of collar 102 and bolt 104 to facilitate coupling collar 102 to bolt 104. In one implementation, collar 102 is swaged onto bolt 104. Alternatively, collar 102 is coupled to bolt 104 by any coupling method.

The implementations described herein include a fastening system for use in coupling a first fastener, such as a collar, to a second fastener, such as a bolt. The fastening system includes a robotic fastening tool that engages at least one of the collar and the bolt for coupling them together. The fastening system also includes a vacuum alignment tool coupled to the fastening tool and configured to house the collar within a bore disposed in the alignment tool. The vacuum alignment tool is also coupled to a vacuum source that applies a suction force through a vacuum channel formed in the alignment tool to hold the collar in position within the alignment tool bore. Because the vacuum alignment tool is coupled to the fastening tool, when the fastening tool is moved into alignment with the bolt, the preloaded collar within the vacuum alignment tool is automatically aligned with the bolt.

As such, the fastening system includes a single step process that delivers the collar directly onto the targeted bolt by holding the preloaded collar within the bore of the vacuum alignment tool and, thus, eliminating the step of independently aligning a collar with a bolt and subsequently aligning a fastening tool with the collar and the bolt. The implementations described herein facilitate simplifying the automation process by reducing the amount of steps required to complete the fastening process. The fastening system described herein further enables increased repeatability, fewer defects, less rework, decreased cycle time, overall cost model improvement.

Although specific features of various examples of the invention may be shown in some drawings and not in others, this is for convenience only. In accordance with the principles of the invention, any feature of a drawing may be referenced and/or claimed in combination with any feature of any other drawing.

This written description uses examples to disclose various examples, which include the best mode, to enable any person skilled in the art to practice those examples, including making and using any devices or systems and performing any incorporated methods. The patentable scope is disposed by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A vacuum alignment tool for holding and aligning a first fastener with a second fastener, said vacuum alignment tool comprising:
    a main body comprising an end wall having an aperture disposed therein configured to receive at least a portion of the first fastener; and
    a vacuum receiving portion coupled to said main body, said vacuum receiving portion comprising a vacuum bore disposed therein, wherein a vacuum channel extends within said main body and within said vacuum receiving portion between said aperture and said vacuum bore.

2. The vacuum alignment tool in accordance with claim 1, wherein said main body comprises a body bore disposed therein configured to receive said first fastener, said body bore extends from a first end of said main body to said end wall.

3. The vacuum alignment tool in accordance with claim 2, wherein said body bore and said aperture are concentric.

4. The vacuum alignment tool in accordance with claim 2 further comprising an interior wall disposed between said body bore and said vacuum bore, wherein said vacuum channel extends through said interior wall.

5. The vacuum alignment tool in accordance with claim 1, wherein said vacuum channel includes a first portion disposed in said end wall and a second portion disposed in said vacuum receiving portion.

6. The vacuum alignment tool in accordance with claim 5, wherein said first portion is substantially perpendicular to said second portion.

7. The vacuum alignment tool in accordance with claim 1, wherein each of said main body and said vacuum receiving portion are substantially cylindrical, wherein said vacuum receiving portion is oriented substantially perpendicular to said main body.

8. The vacuum alignment tool in accordance with claim 1, wherein said end wall comprises a cover that at least partially defines said vacuum channel.

9. A fastening system comprising:
   a fastening tool configured to couple a first fastener to a second fastener;
   a vacuum alignment tool coupled to said fastening tool, said vacuum alignment tool comprising:
      a main body comprising an end wall having an aperture disposed therein configured to receive at least a portion of the first fastener; and
      a vacuum receiving portion coupled to said main body, said vacuum receiving portion comprising a vacuum bore define therein, wherein a vacuum channel is disposed between said aperture and said vacuum bore; and
   a vacuum source coupled to said vacuum receiving portion and configured to apply a suction force through said vacuum channel to hold at least said portion of said first fastener within said aperture.

10. The fastening system in accordance with claim 9, wherein said main body comprises a body bore disposed therein configured to receive said first fastener, said body bore extends from a first end of said main body to said end wall.

11. The fastening system in accordance with claim 10, wherein said body bore and said aperture are concentric.

12. The fastening system in accordance with claim 10 further comprising an interior wall disposed between said body bore and said vacuum bore, wherein said vacuum channel extends through said interior wall.

13. The fastening system in accordance with claim 9, wherein said vacuum channel includes a first portion disposed in said end wall and a second portion disposed in said vacuum receiving portion, wherein said first portion is substantially perpendicular to said second portion.

14. A method of coupling a first fastener to a second fastener using a fastening system including a fastening tool, a vacuum alignment tool, and a vacuum source, said method comprising:
   positioning the first fastener within a body bore disposed in a main body of the vacuum alignment tool, the main body comprising an end wall having an aperture;
   coupling a vacuum receiving portion to said main body, said vacuum receiving portion comprising a vacuum bore disposed therein, wherein a vacuum channel extends within said main body and within said vacuum receiving portion between said aperture and said vacuum bore;
   activating the vacuum source to apply a suction force to the first fastener through a the vacuum channel disposed in the vacuum alignment tool;
   and positioning the first fastener about the second fastener.

15. The method in accordance with claim 14 further comprising aligning the first fastener with the second fastener such that the first and second fasteners are concentric.

16. The method in accordance with claim 14 further comprising coupling the vacuum source to the vacuum bore disposed in the vacuum receiving portion of the vacuum alignment tool.

17. The method in accordance with claim 14, wherein positioning the first fastener comprises positioning at least a portion of the first fastener within the aperture disposed in the end wall of the main body portion.

18. The method in accordance with claim 17, wherein activating the vacuum source comprises applying the suction force through a first portion of the vacuum channel disposed in the end wall and in flow communication with the aperture and through a second portion of the vacuum channel disposed in the vacuum receiving portion of the vacuum alignment tool coupled to the vacuum source.

19. The method in accordance with claim 14 further comprising deactivating the vacuum source after the first fastener is positioned about the second fastener.

20. The method in accordance with claim 14 further comprising engaging the second fastener with the fastening tool to couple the first fastener to the second fastener.

* * * * *

UNITED STATES PATENT AND TRADEMARK OFFICE
CERTIFICATE OF CORRECTION

PATENT NO. : 10,052,770 B2
APPLICATION NO. : 14/819669
DATED : August 21, 2018
INVENTOR(S) : Porter et al.

Page 1 of 1

It is certified that error appears in the above-identified patent and that said Letters Patent is hereby corrected as shown below:

In the Specification

In Column 3, Line 62, delete "bore 1154" and insert therefor -- bore 154 --.

In the Claims

In Column 8, Line 14, Claim 14, delete "a the" and insert therefor -- the --.

Signed and Sealed this
Sixteenth Day of October, 2018

Andrei Iancu
*Director of the United States Patent and Trademark Office*